（12）United States Patent
Alejo Trevijano

(10) Patent No.: US 7,113,334 B2
(45) Date of Patent: Sep. 26, 2006

(54) AUTOSTEREOSCOPIC VISION SYSTEM

(76) Inventor: José Javier Alejo Trevijano, Palacios Malaver, 2, 41003 Sevilla (ES)

( * ) Notice: Subject to any disclaimer, the term of this patent is extended or adjusted under 35 U.S.C. 154(b) by 0 days.

(21) Appl. No.: 10/745,292

(22) Filed: Dec. 23, 2003

(65) Prior Publication Data

US 2004/0165262 A1 Aug. 26, 2004

Related U.S. Application Data

(63) Continuation of application No. PCT/ES02/00318, filed on Jun. 28, 2002.

(30) Foreign Application Priority Data

Jun. 29, 2001 (ES) ................................ 200101523

(51) Int. Cl.
G02B 27/22 (2006.01)
G02B 27/24 (2006.01)
(52) U.S. Cl. ...................... 359/466; 359/472; 359/464; 359/833
(58) Field of Classification Search ................ 359/462, 359/464, 466, 471, 472, 474, 477, 376, 377, 359/378, 833, 834, 463, 473, 478, 479
See application file for complete search history.

(56) References Cited

U.S. PATENT DOCUMENTS

| 710,237 | A | * | 9/1902 | Barnard | ....................... 359/471 |
| 5,245,472 | A | * | 9/1993 | Hegg | .......................... 359/496 |
| 5,528,426 | A | * | 6/1996 | Howes | ........................ 359/629 |
| 5,986,801 | A | * | 11/1999 | Volk et al. | .................. 359/376 |

FOREIGN PATENT DOCUMENTS

GB          2199154 A    *   6/1988

\* cited by examiner

Primary Examiner—Audrey Chang
(74) Attorney, Agent, or Firm—Klauber & Jackson LLC

(57) ABSTRACT

It comprises a first prism (10, 10a, 10b), with triangular base, on which is arranged at least one second transparent prism (2, 11) the combination defining a prismatic body which is arranged on the stereoscopic pair so that, when the user's eyes (13, 14) are positioned in front of the upper face of the prismatic body, each eye visualises the corresponding stereogram (3, 4) via the upper face of the prismatic body, reproducing the three-dimensional vision effect. In an embodiment of the invention the second prism (2, 11) is triangular and provision has been made for a third prism (12, 15) of identical configuration to the above, in which case the stereoscopic photographs/images (3, 4) are divided into halves A, B, C, D which are duly arranged for achieving three-dimensional visualisation. It comprises illumination equipment (5), some lenses (8, 8a) and a directional filter (9).

24 Claims, 7 Drawing Sheets

AUTOSTEREOSCOPIC VISION SYSTEM

RELATED APPLICATIONS

The present application is a Continuation of co-pending PCT Application No. PCT/ES02/00318, Filed on Jun. 28, 2002, which in turn, claims priority from Spanish Application Ser. No. 200101523, filed Jun. 29, 2001. Applicants claim the benefits of 35 U.S.C. §120 as to the PCT application and priority under 35 U.S.C. §119 as to said Spanish application, and the entire disclosures of both applications are incorporated herein by reference in their entireties.

OBJECT OF THE INVENTION

The invention comprises an autostereoscopic vision system for visualising photographs/images of stereoscopic pairs permitting the reproduction of the three-dimensional vision effect of stereoscopic pairs on the basis of a transparent prism of optimised dimensions and low cost.

BACKGROUND OF THE INVENTION

The obtaining of stereoscopic photographs or images in such a way that, by visualising each of them with just one of the eyes, a three-dimensional vision effect is obtained, is known in the state of the art.

In this regard, the use of different types of devices of differing complexity is known, an example of which is the case of using simple glasses made from filters of complementary colours or complex glasses on which the images corresponding to each eye are independently projected.

The invention comes within those devices that use lenses and/or mirrors which permit visualisation of each of the photographs solely by one of the eyes in order to produce the three-dimensional vision effect.

DESCRIPTION OF THE INVENTION

In order to achieve autostereoscopic visualisation of photographs/images of stereoscopic pairs by means of using prisms, the basic structure of the invention is characterised in that it consists of a first transparent prism with triangular base, on which is arranged at least one second transparent prism, in such a way that the combination determines a prismatic body which is arranged on the stereoscopic pair, for which, when positioning the user's eyes in front of the upper face of the prismatic body with the proper angle and at a distance which can be greater than 2 meters, each eye visualises the corresponding stereogram via that upper face of the prismatic body, reproducing the three-dimensional vision effect of the photographs/images.

In an embodiment of the invention, the first prism is a central prism with triangular base having at least two sides of equal length, in such a manner that on the faces making up those sides the second transparent prism and a third transparent prism are arranged, both presenting an identical configuration in which their bases are constituted by a right-angle triangle.

This structure is arranged in such a way that the edge joining the two sides of equal length of the central prismatic body points towards the upper face of the rectangular prismatic body, so that the upper face is constituted by one of the faces of the second prism and by another of the faces of the third prism, both arranged in a single plane.

In order to achieve the reproduction of the three-dimensional vision effect of the stereoscopic pairs, the photographs/images are divided into two halves; so, the left photograph/image consists of a left half A and a right half B, and the right photograph/image consists of a left half C and a right half D, in such a way that these halves are arranged in the following order: C, A, D, B; the halves A and B being inverted, in other words, as if the image on them were being visualised from the opposite face.

In an embodiment of the invention, half A is arranged in a lower left half of a lower face of the first prism; half D is arranged next to half A in a lower right half of the lower face of the first prism; half C is arranged in a plane perpendicular to the half A, but inverted for which it is located in the lower part of the lateral face of the second prism; half B is arranged in a plane perpendicular to half D, though inverted for which it is located in the lower part of a side face of the third prism.

In order to permit three-dimensional visualisation of the stereoscopic pairs according to the structure described above, provision has been made so that the halves C, A, D, B are arranged on a foldable surface in such a way that the halves constituting the central prism are folded and separated in order to locate the halves A and D on the inner faces of the halves constituting the central prism, with the halves C and D being located on the lower face of the rectangular prismatic body which is formed by one of the faces of each of the second and third prisms, in other words, the half C is arranged on the lower face of the second prism and the half D is arranged on the lower face of the third prism.

The arrangement of the halves B and C in planes perpendicular to the halves A and D has been described, but there also exists the possibility of all of them being arranged in a single plane, in which case the halves C and D are projected on the lateral faces of the first and second prisms.

In an embodiment of the invention, the projection of halves C, D is done by means of a plurality of optical fibres, while in another embodiment of the invention these halves are projected by means of concave mirrors. In this latter case, the halves A and D present a reduced size compared to halves C and D in order to compensate for the effect of the concave mirrors and permit correct visualisation in three dimensions.

There is also the possibility of projecting images by means of plane mirrors.

In an embodiment of the rectangular prismatic body, the central prism constituting it is materialised from two symmetric prismatic halves, in which case the upper face of the said rectangular prismatic body is constituted by the two halves of the central prism.

In another embodiment of the invention, the first prism is a central prism with triangular base, which includes at least two sides of equal length, with the particular feature that arranged on the faces including these sides are the second prism and the third prism, both being of identical configuration of rhomboid bases, in which case the halves C and B are located on one of the faces of the second and third prism, and the halves A and D are located on one of the faces of the central prism; and all this in such a manner that all the halves are arranged in a single plane.

An example of the use of plane mirrors consists of an embodiment in which one of the faces of the central prism constitutes the upper face of the set of prisms, with a mirror being arranged laterally and as a continuation of the lateral face of the second and third prism, beneath which mirror are located the halves C and B respectively, while the halves A and D are located on one of the faces of the central prism.

In all the embodiments described, the possibility exists that the photographs/images of stereoscopic pairs or the different halves C, A, D, B which constitute them are arranged on a tape which is pulled by a motor governed by a control circuit for sequentially visualising a plurality of stereoscopic photographs by means of control of the motor by acting on some drive modules.

There also exists the possibility of the photographs/images of stereoscopic pairs or the halves C, A, D, B which constitute them being visualised on a screen, in which case use can be made of any of the devices described in which the stereoscopic photographs/images or the halves constituting them are located in a single plane. In this embodiment, provision has been made for a means of securing the set of prisms on the screen in order to produce the three-dimensional vision effect of the photographs/images of stereoscopic pairs.

Furthermore, in each of the embodiments described, provision has been made for the incorporation of means of illumination of the stereoscopic photographs/images, such as for example by means of a diode producing a white light.

Another characteristic common to all the embodiments described consists of the fact that in the upper face of the prismatic body provision has been made for some lenses for adjusting the join of the halves of the stereoscopic photographs/images, increasing the image in three dimensions, eliminating the visualisation of the edges of the prisms and adjusting the point of visualisation.

Also, in all the embodiments provision has been made for the incorporation of a directional filter which helps the observer to position himself in front of the upper face of the prismatic body in such a way that he can quickly locate the effect in three dimensions, since outside the central zone of the filter the image becomes dark and all that is seen is the three-dimensional format.

It can also be stated that the invention optionally includes means of detection of a displaced position of the user with respect to the upper face of the rectangular prismatic body and means of displacement of some optical means in order to position the user's eyes in front of the upper face of the rectangular prismatic body.

In an embodiment of the invention, the means of detection of a displaced position of the user are defined by at least one sensor which, starting from a control circuit, governs the functioning of a servomotor for displacing the optical means.

The sensor can, for example, be an infrared or ultrasound sensor.

The optical means are defined by a lens or a variable prism of the type used in video cameras.

In another embodiment of the invention, the optical means can be defined by the actual rectangular prismatic body, in such a way that the servomotor governs the displacement of that body in order to position the user's eyes in front of the upper face of it.

Attached below, in order to facilitate a better understanding of this description, and forming an integral part thereof, is a series of figures in which, by way of illustration only and not to be regarded as restrictive, the object of the invention has been represented.

Figure 1:
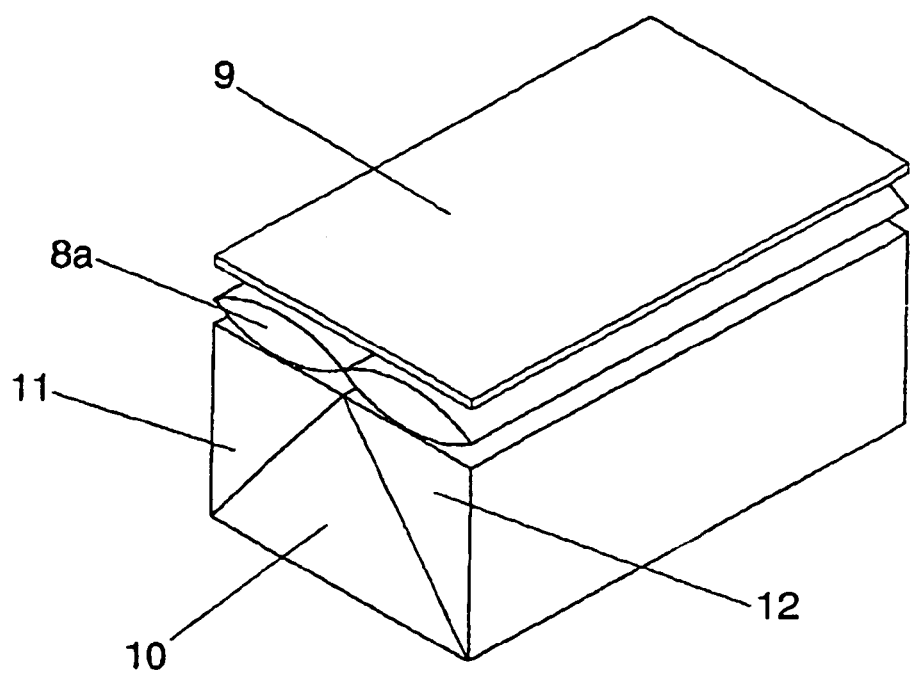
FIG. 1 shows a perspective view of a possible example of embodiment of the invention in which three prisms are used in order to produce three-dimensional visualisation.
Figure 2:
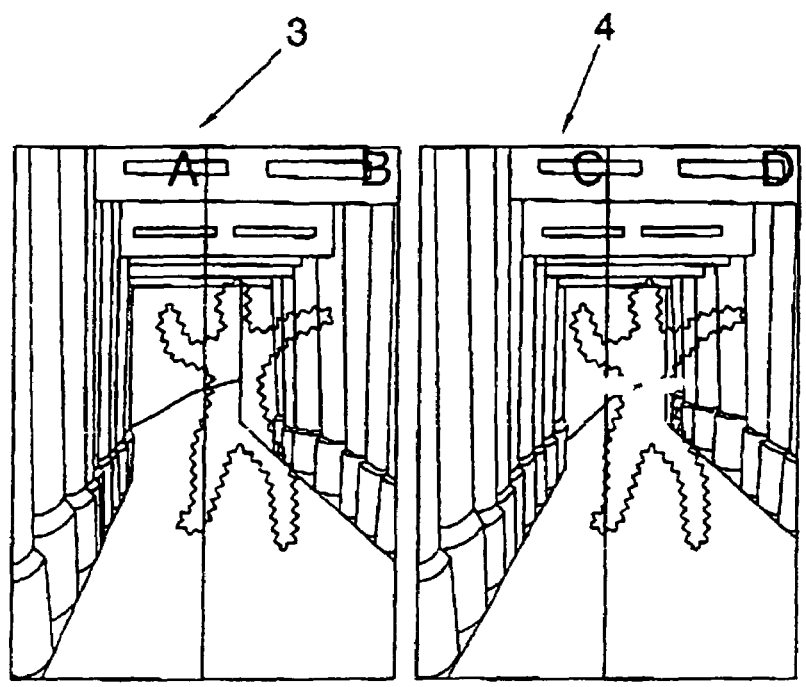
FIG. 2 shows a division into two halves of the photographs/images of stereoscopic pairs.

DESCRIPTION OF PREFERRED
EMBODIMENTS OF THE INVENTION

Given below is a description of the invention based on the figures commented on above.

In order to achieve that the photographs 3 and 4 have the same light level, provision has been made for means of illumination consisting of a diode 5 of white light which, for example, can be fed by the corresponding battery 6 via a switch 7.

Moreover, in order to optimise the result of the three-dimensional effect, a lens 8 is provided on the upper face of the second prism 2, which constitutes the upper face of the prismatic body, in such a way that it enlarges the three-dimensional image at the same time as eliminating the vision of the inner edges of the prismatic body, in addition to permitting the observation position of the user to be varied. This position varies depending on the material used in the manufacture of the transparent prisms. Above the lens 8, a directional filter 9 is provided which helps to centre the position of the observer on the upper face of the prismatic body, for which said filter darkens the lateral vision, in such a way that it helps the observer to have an immediate visualisation of the three-dimensional effect, so that even for persons who are unfamiliar with the functioning of the system it helps them to position themselves in front of the upper face of the prismatic body in order to perceive the three-dimensional effect. By means of the directional filter 9 the viewfinder exclusively shows the image in three-dimensional format since, outside the front angle, the image becomes dark and is therefore not visible.

FIG. 1 shows another example of embodiment in which the first prism is constituted by a central prism 10 of triangular base, with two equal sides, on which is arranged the second prism 11 and a third prism 12. In this case two lenses 8a are used instead of one in order to achieve the reproduction of the three-dimensional effect, as is described below. In this figure, the illumination device has not been represented for the sake of simplicity.

In order to achieve three-dimensional reproduction by means of the device of FIG. 1, the photographs 3 and 4 need to be divided into two equal halves. So, the left photograph 3 has been divided into the left half A and the right half B, while the right photograph 4 has been divided into the left half C and the right half D.

Figure 3:
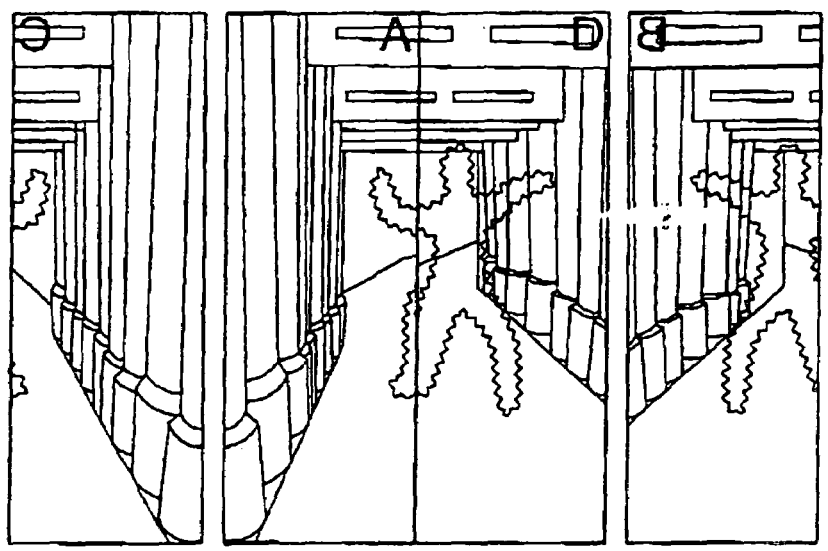
FIG. 3 shows a view of the arrangement of the different halves of the photographs/images of stereoscopic pairs in order to permit three-dimensional reproduction of them.

Moreover, those halves are arranged in the following order: C, A, D and B, with the particular feature that the halves C and B are inverted, in other words rotated through 180° with respect to their longitudinal axis (FIG. 3).

Figure 4:
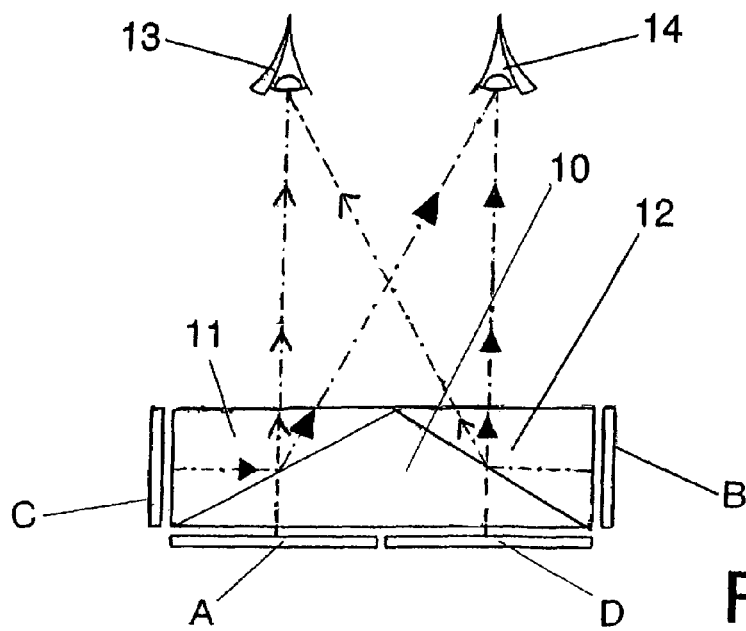
FIG. 4 shows a schematic side view of FIG. 1 in which the halves of the photographs/images of stereoscopic pairs have been added in order to permit their three-dimensional vision.

In order to achieve three-dimensional visualisation by means of the device of FIG. 1, the inverted halves C and B have been arranged on the side walls of the second prism 11 and of the third prism 12, as shown in FIG. 4, in such a way that the left eye 13 visualises the half A and the half B but inverted due to the effect of the prism, due to which this half must originally be positioned inverted. In the same way, the right eye 14 visualises the halves D and C, reproducing the three-dimensional vision effect, which is improved by means of including the two lenses 8a, each of which favours the joining of the corresponding halves to be visualised with each eye.

FIG. 4 and beyond do not include the illumination element,enses, nor the directional filter, in order to simplify those figures, but such elements are arranged in all of the embodiments of the invention since they improve the three-dimensional effect, as has been commented on earlier.

Figure 5:
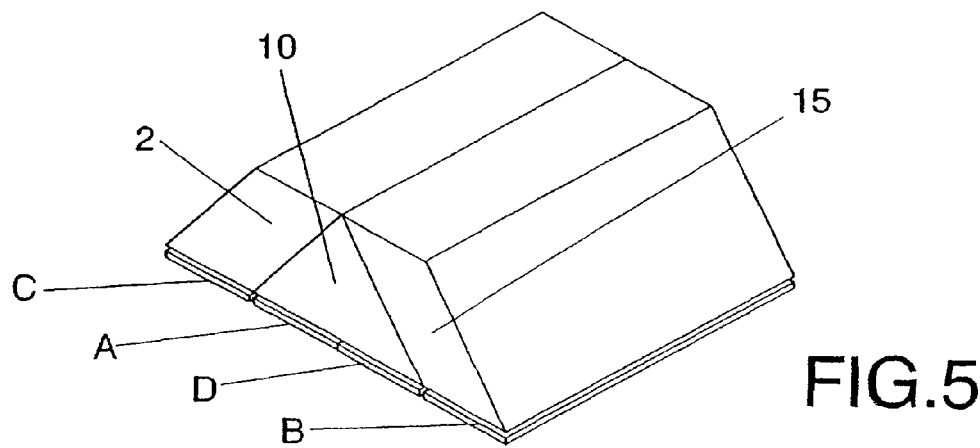
FIG. 5 shows a schematic view in perspective of another possible example of embodiment of the invention, along with the arrangement of the halves of the photographs/images of stereoscopic pairs, in order to permit their three-dimensional vision.

FIG. 5 shows an example of embodiment in which the second prism 2 and the third prism 3 have a rhomboid base. In this example, the halves A and D are arranged on the lower face of the first prism 10 and the halves C and B are respectively arranged on the lower face of the second and third prism, without being inverted, on account of the effect of the new arrangement of the second and third prism.

Figure 6:
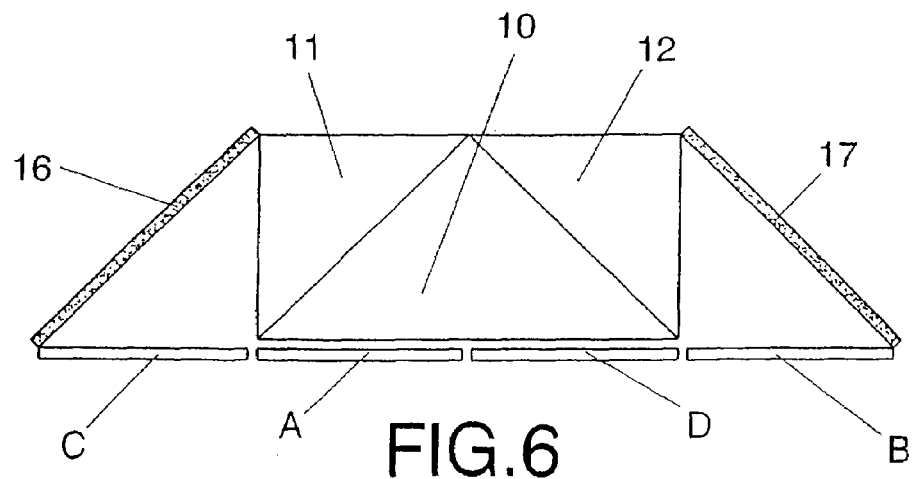
FIG. 6 shows a side view of another possible example of embodiment of the invention in which mirrors are used for reflecting the images of the outer halves of the stereoscopic pairs.

FIG. 6 shows another possible example of embodiment that uses the structure of FIG. 4 and in which the halves C, A, D and B are arranged in a form identical to the embodiment of FIG. 5, for which mirrors 16, 17 are also added which cause the projection of the halves C and D onto the side walls of the second prism 11 and of the third prism 12.

Figure 7:
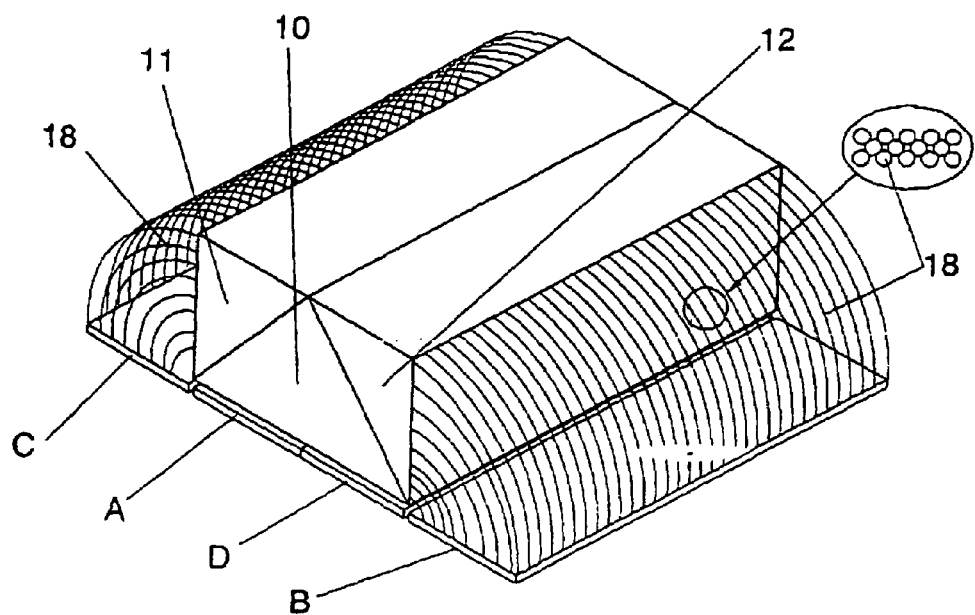
FIG. 7 shows another example of embodiment in which the images of the outer halves of stereoscopic pairs are projected by means of optical fibres onto the lateral surfaces of the first and second prisms.

FIG. 7 shows a similar example to that of FIG. 6, but in this case the projection of the halves C and B on the side faces of the second prism 11 and of the third prism 12, respectively, is effected by means of optical fibres 18.

Figure 8:
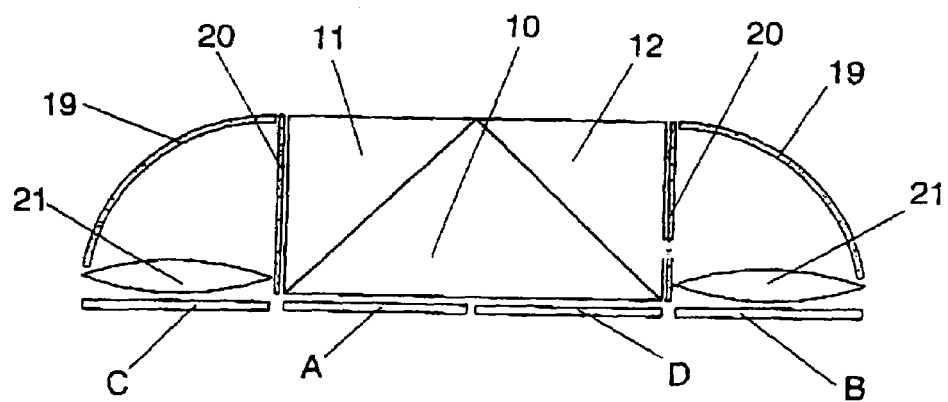
FIG. 8 shows a schematic side view of another example of embodiment in which concave mirrors have been used for projecting the images of the outer halves of the stereoscopic pairs.
Figure 9:
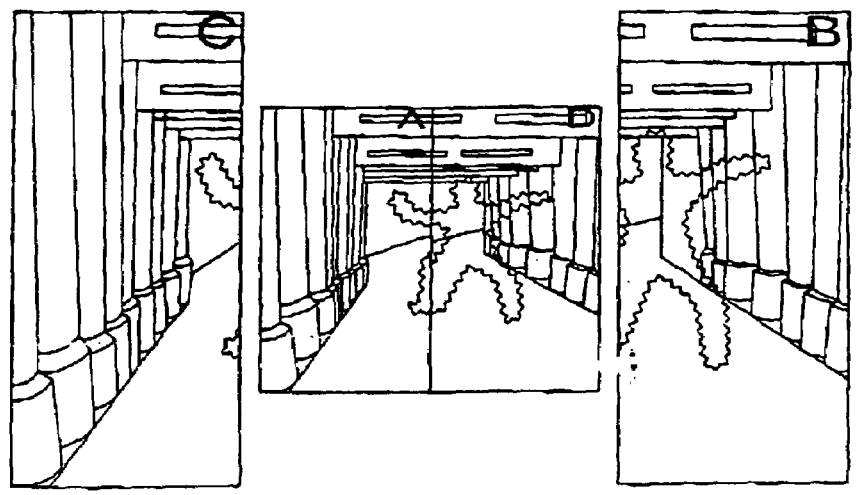
FIG. 9 shows the structure of the halves of photographs/images of stereoscopic pairs for their visualisation according to the example of embodiment of the previous figure.

FIG. 8 represents another possible example of embodiment equivalent to that of FIG. 7, but in this case the projection of the halves C and B on the side walls of the second prism 11 and of the third prism 12 respectively is effected by means of concave mirrors 19. In this case, the format of the halves of the stereoscopic pair to use is the format represented in FIG. 9, in which the halves A and D have smaller proportions than halves C and B in order to compensate the effect produced by the concave mirrors, since they reduce the image.

In the example of FIG. 8, certain lenses 21 have also been used,ocated above the halves C and B, as have some diffused glass screens 20 which facilitate the stated projection.

Figure 10:
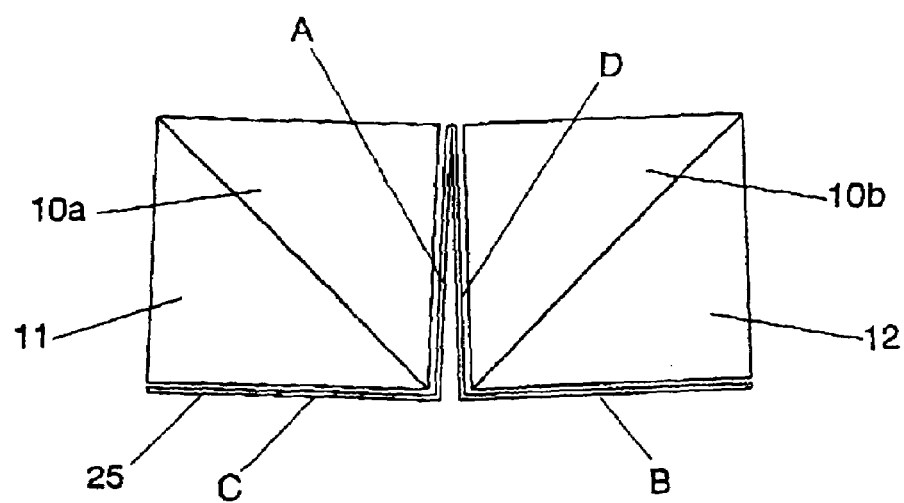
FIG. 10 shows another example of embodiment in which the first prism comprises two symmetric prisms for permitting vision of photographs forming part of a foldable surface, such as for example a magazine, newspaper, etc.

FIG. 10 shows another possible example of embodiment in which the central prism 10 is divided into two symmetric halves 10a and 10b and the rectangular prismatic unit is inverted, in other words in this case the upper face of the rectangular prismatic body is constituted by one of the faces of each of the symmetric halves 10a and 10b.

This embodiment has the aim of permitting visualisation of photographs printed on a foldable surface 25, such as for example the surface of a magazine, in such a way that separation of the halves 10a and 10b is permitted in order to arrange the halves A and D in the inner faces of the halves constituting the central prism, at the same time as arranging the halves C and B on the lower face of the second and third prism 11 and 12 respectively, in such a way that the three-dimensional vision effect is reproduced on the basis of photographs printed in magazines, newspapers, etc., according to the described format.

Figure 11:
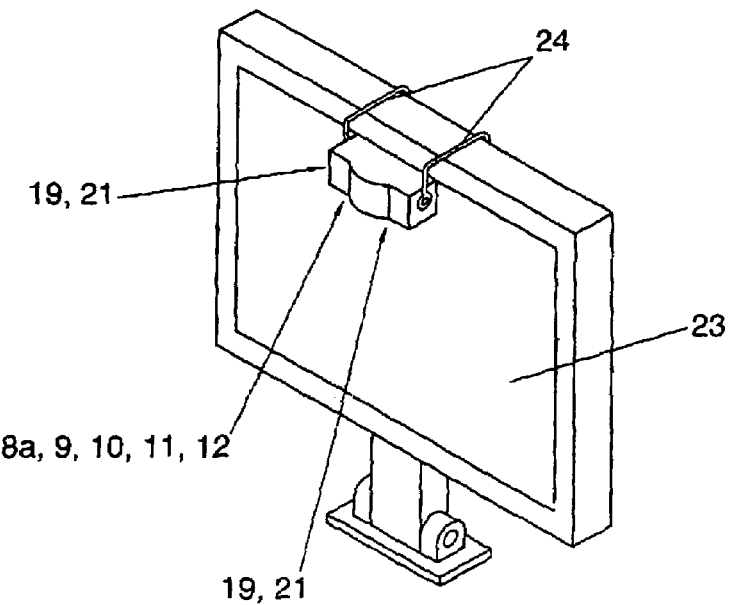
FIG. 11 shows an example of embodiment in which three-dimensional vision is permitted of images projected onto a screen, for which provision has been made of means of securing of the prisms to that screen. In this particular example, the means of securing are intended to support the unit represented in FIG. 8.

The possibility also exists of the images being projected on a screen 23, as shown in FIG. 11, in which case it is obvious that the halves of the stereoscopic pairs must at all times be in the same plane, though any of the described procedures can be used for carrying out projection on the side faces of the second and third prism. In this example of embodiment, the prisms are provided with securing means 24 on the screen 23, in such a way that visualisation in three dimensions is facilitated.

In the specific example of embodiment of FIG. 11, the securing means 24 are supporting the prisms shown in the embodiment of FIG. 8.

The possibility exists that the photographs of stereoscopic pairs or of different halves C, A, D, B constituting them are joined forming a tape 22 which is pulled by a motor governed by a control circuit (not represented in the figures), in order to visualise a plurality of stereoscopic photographic by means of forward/rewind of the motor acting on some drive modules.

Figure 12:
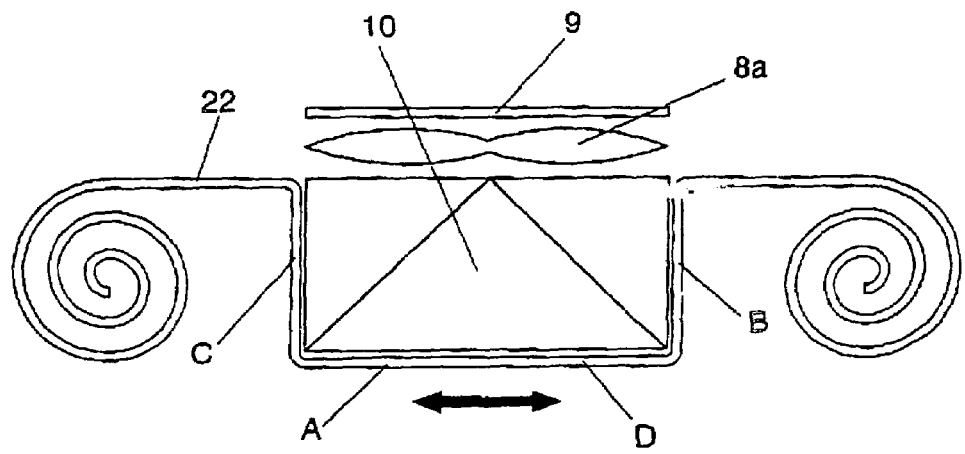
FIG. 12 shows an example of embodiment of the invention in which the photographs/images of stereoscopic pairs or their halves are joined on a tape which is pulled by a motor in order to permit sequential visualisation of a plurality of photographs/images of stereoscopic pairs, by means of forward/rewind of the motor.

The example shown in FIG. 12 corresponds to that represented in FIGS. 1 and 4 though obviously this functioning philosophy can be applied to any of the examples described.

Figure 13:
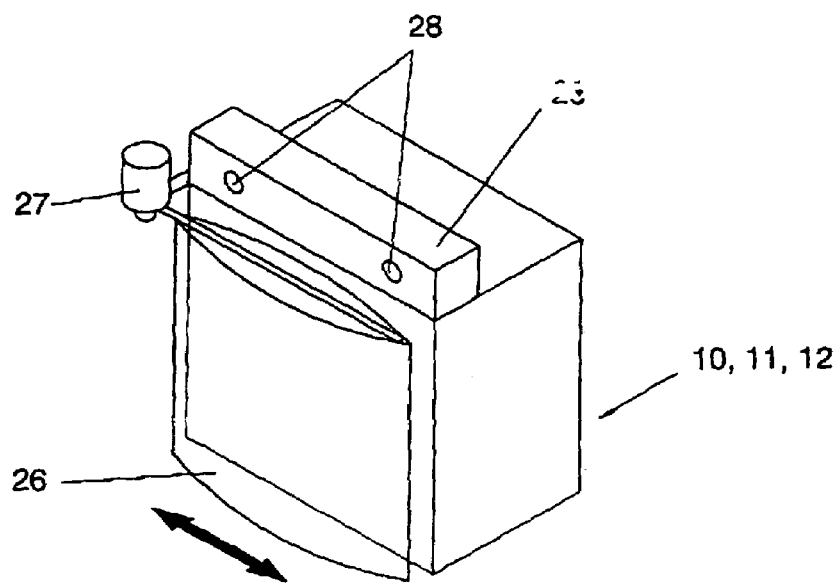
FIG. 13 shows a schematic view in perspective of an example of embodiment in which are included means of detection of a displaced position of the user with respect to the upper face of the rectangular prismatic body and means of displacement of a lens for positioning the user's eyes in front of the upper face of the rectangular prismatic body. In this example of embodiment, the upper face has been represented arranged towards one side for its visualisation from a side position.
Figure 14:
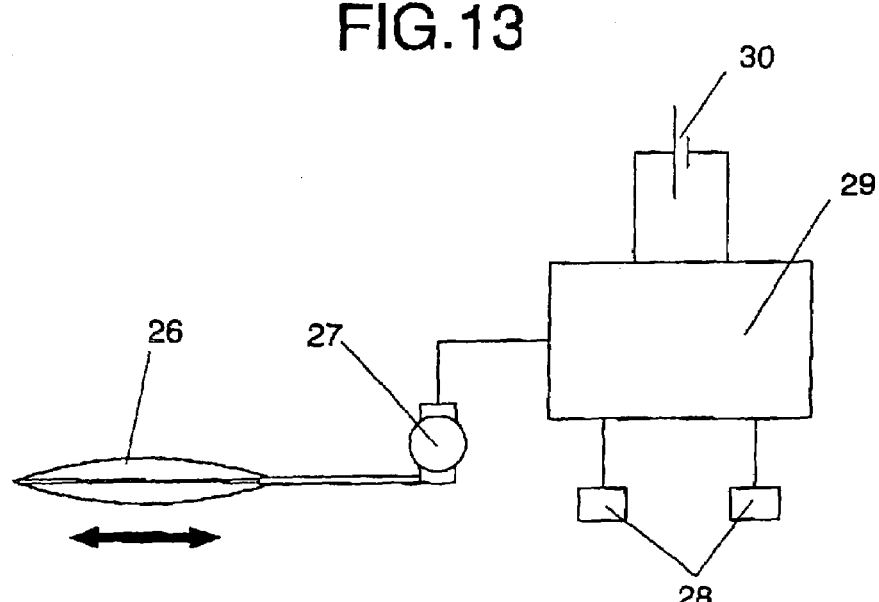
FIG. 14 shows a schematic view of the displacement mechanism of the lens for orientating it towards a side position in front of the user's eyes.

FIG. 13 shows an example of embodiment which includes a lens 26 that is connected to a servomotor 27 which is governed by a control circuit 29 fed by the corresponding battery 30, and which is also connected to two infrared sensors 28.

The lens 26 is located in front of the upper face of the prism, which in the example of embodiment has been arranged laterally so that the user can visualise the three-dimensional effect from a lateral position, in such a way that if the user is not in front of that upper face but is instead to one side of it, this is detected by the infrared sensors 28, in such a way that the control circuit 29 governs the functioning of the servomotor 27 in order to locate the lens 26 so that the user's eyes remain in front of that upper face of the prism, thus obtaining the three-dimensional vision effect.

Evidently, the sensors can be of any other type, such as ultrasound for example, and the lens can consist of another kind of optical device, as might be a variable prism of the kind used in video cameras. Obviously, provision could also be made for the servomotor to govern the position of the prism with respect to the location of the user's eyes.

The invention claimed is:

1. Autostereoscopic vision system for visualising stereograms comprising:
    at least one first central transparent prism having a triangular base;
    a second transparent prism;
    wherein:
        the system further comprises a third transparent prism;
        the second transparent prism and the third transparent prism:
            are each arranged on a face of the at least one first prism;
            have an equivalent configuration;
        the stereogram comprises:
            a left image divided in two halves, a left half and a right half;
            a right image divided in two halves, a left half and a right half;
        the left half of the left image and the right half of the right image are arranged on a second face of the at least one first prism;
        the at least one first prism, the second prism and the third prism form a prismatic body so that when a user's eyes are positioned in front of an upper face of the prismatic body in a proper angle, the eyes visualise a corresponding stereogram via said upper face of the prismatic body, a three-dimensional vision effect of the images being reproduced.

2. Autostereoscopic vision system according to claim 1, wherein the first prism, the second prism and the third prism, form a rectangular prismatic body in which the first prism comprises at least two side faces of equal length, the second prism and the third prism being arranged on said faces, the second prism and the third prism having right-angle triangle bases.

3. Autostereoscopic vision system according to claim 2, wherein an edge joining the two side faces of the first prism points towards the upper face of the rectangular prismatic body, said upper face comprising one of the faces of the second prism and another of the faces of the third prism, said two faces being arranged in a single plane.

4. Autostereoscopic vision system according to claim 3, wherein the left and right halves of the left and right images are arranged in the following order: left half of the right image, left half of the left image, right half of the right image and right half of the left image, and in that the left half of the right image and the right half of the left image are inverted.

5. Autostereoscopic vision system according to claim 4, wherein
    the left half of the left image is arranged in a lower left half of a lower face of the first prism;
    the right half of the right image is arranged next to the left half of the left image in a lower right half of the lower face of the first prism;
    the left half of the right image is arranged in a plane perpendicular to the left half of the left image and located in the lower part of a side face of the second prism;
    the right half of the left image is arranged in a plane perpendicular to the right half of the right image and located in the lower part of a side face of the third prism.

6. Autostereoscopic vision system according to claim 3, wherein the left half of the right image, the left half of the left image, the right half of the right image and the right half of the left image are arranged in a single plane.

7. Autostereoscopic vision system according to claim 6, wherein the left half of the right image and the right half of the left image are projected on the side faces of the second prism and third prism.

8. Autostereoscopic vision system according to claim 7, wherein the left half of the right image and the right half of the left image are projected by means of a plurality of optical fibres.

9. Autostereoscopic vision system according to claim 7, wherein the left half of the right image and the right half of the left image are projected by means of concave mirrors, a lens being arranged on the left half of the right image and the right half of the left image directing the image towards the concave mirrors which in turn project the image onto a diffused glass screen located on the side faces of the second prism and of the third prism.

10. Autostereoscopic vision system according to claim 9, wherein the left half of the left image and the right half of the right image have a reduced size compared to the left half of the right image and the right half of the left image for compensating for an effect produced by the concave mirrors and permitting correct visualisation in three dimensions.

11. Autostereoscopic vision system according to claim 7, wherein the images are projected by means of plane mirrors.

12. Autostereoscopic vision system according to claim 3, wherein the left half of the right image, the left half of the left image, the right half of the right image and the right half of the left image are visualised on a video, computer or television screen.

13. Autostereoscopic vision system according to claim 12, wherein the system comprises securing means for securing of the set of prisms for producing the three-dimensional vision effect of the left half of the right image, the left half of the left image, the right half of the right image and the right half of the left image.

14. Autostereoscopic vision system according to claim 2, wherein the first prism comprises two symmetric prismatic halves and in that the upper face of the rectangular prismatic body comprises faces of the two prismatic halves.

15. Autostereoscopic vision system having photographic halves according to claim 12, wherein the left half of the right image, the left half of the left image, the right half of the right image and the right half of the left image are arranged on a foldable surface so that the photographic halves are folded and the halves forming the first prism are separated for arranging the left half of the left image and the right half of the right image on inner faces of the halves constituting the first prism, and for arranging the left half of the right image and the right half of the left image on a face of the rectangular prismatic body, so that the left half of the right image is arranged on the lower face of the second prism and the right half of the left image is arranged on the lower face of the third prism.

16. Autostereoscopic vision system according to claim 14, wherein the left half of the right image, the left half of the left image, the right half of the right image and the right half of the left image are arranged on a foldable surface so that the halves of images are folded and the halves forming the first prism are separated for arranging the left half of the left image and the right half of the right image on inner faces of the halves constituting the first prism, and for arranging the left half of the right image and the right half of the left image on the inner face of the rectangular prismatic body, so that the left half of the right image is arranged on the lower face of the second prism and the right half of the left image is arranged on the lower face of the third prism.

17. Autostereoscopic vision system according to claim 2, wherein the first prism is a central prism of triangular base which comprises at least two sides of equal length, the second prism and the third prism being arranged on the faces comprising the equal-length sides, both prisms being of equal configuration of rhomboid bases, so that the left half of the right image is arranged on the lower face of the second prism, the right half of the left image is arranged on the lower face of the third prism and the left half of the left image and the right half of the right image are located on the lower face of the central prism.

18. Autostereoscopic vision system according to claim 1, wherein the left half of the right image, the left half of the left image, the right half of the right image and the right half of the left image are arranged on a tape which is pulled by a motor, governed by a control circuit for visualising a plurality of stereoscopic images by means of control of the motor by acting on a plurality of drive controls.

19. Autostereoscopic vision system according to claim 1, wherein the system comprises lighting means for lighting the left half of the right image, the left half of the left image, the right half of the right image and the right half of the left image.

20. Autostereoscopic vision system according to claim 19, wherein the lighting means comprises a white light diode.

21. Autostereoscopic vision system according to claim 1, wherein the upper face of the prismatic body is provided with lenses for adjusting the join of the left half of the right image, the left half of the left image, the right half of the right image and the right half of the left image, increasing the three-dimensional vision effect of the image, eliminating the visualisation of the edges of the prisms and adjusting the point of visualisation.

22. Autostereoscopic vision system according to claim 1, wherein the system comprises a lens which is provided on the upper face of the second prism, a directional filter being placed above the lens, said directional filter obscuring lateral vision for making an observer to position himself in front of the upper face from which the three-dimensional effect is visualised.

23. Autostereoscopic vision system according to claim 1, wherein the system comprises a detecting means for detecting a displaced position of the user with respect to the upper face of prismatic body and a displacing means for displacing an optical means having either a lens or a variable prism and the prismatic body, for positioning user's eyes in front of the upper face of the prismatic body.

24. Autostereoscopic vision system according to claim 23, wherein the detecting means for detecting a displaced position of the user comprises at least one sensor which, from a control circuit, governs the functioning of a servomotor for displacing the optical means.

* * * * *